United States Patent
Patey et al.

(10) Patent No.: US 9,407,637 B2
(45) Date of Patent: Aug. 2, 2016

(54) METHOD FOR MANAGING AND CHECKING DATA FROM DIFFERENT IDENTITY DOMAINS ORGANIZED INTO A STRUCTURED SET

(75) Inventors: Alain Patey, Issy les Moulineaux (FR); Herve Chabanne, Issy les Moulineaux (FR); Julien Bringer, Issy les Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 218 days.

(21) Appl. No.: 14/237,556

(22) PCT Filed: Aug. 2, 2012

(86) PCT No.: PCT/EP2012/065153
§ 371 (c)(1), (2), (4) Date: Feb. 6, 2014

(87) PCT Pub. No.: WO2013/020890
PCT Pub. Date: Feb. 14, 2013

(65) Prior Publication Data
US 2014/0181932 A1    Jun. 26, 2014

(30) Foreign Application Priority Data
Aug. 9, 2011    (FR) .................................... 11 57261

(51) Int. Cl.
*H04L 29/06* (2006.01)
*H04L 9/32* (2006.01)
*H04L 9/08* (2006.01)

(52) U.S. Cl.
CPC .......... *H04L 63/0884* (2013.01); *H04L 9/0866* (2013.01); *H04L 9/3231* (2013.01); *H04L9/3255* (2013.01); *H04L 9/3268* (2013.01); *H04L 63/0853* (2013.01); *H04L 63/0861* (2013.01); *H04L 2209/42* (2013.01)

(58) Field of Classification Search
None
See application file for complete search history.

(56) References Cited

U.S. PATENT DOCUMENTS

| | | | | |
|---|---|---|---|---|
| 6,993,596 B2* | 1/2006 | Hinton | ..................... | G06F 21/41 709/204 |
| 7,793,095 B2* | 9/2010 | Hardt | ..................... | G06F 21/33 713/155 |
| 8,670,562 B2 | 3/2014 | Bringer et al. | | |
| 2010/0122080 A1 | 5/2010 | Lee et al. | | |
| 2010/0125895 A1* | 5/2010 | Shull | ..................... | H04L 63/08 726/4 |

FOREIGN PATENT DOCUMENTS

| | | |
|---|---|---|
| EP | 1 164 745 A2 | 12/2001 |
| FR | 2 925 732 | 6/2009 |
| WO | WO 2009/028794 A2 | 3/2009 |

OTHER PUBLICATIONS

Bringer, J., et al., "Backward Unlinkability for a VLR Group Signature Scheme with Efficient Revocation Check," Cryptology ePrint Archive, Jul. 12, 2011, XP055024181, pp. 1-6.

* cited by examiner

*Primary Examiner* — Andrew Nalven
*Assistant Examiner* — Abdulhakim Nobahar
(74) *Attorney, Agent, or Firm* — Blakely Sokoloff Taylor & Zafman LLP

(57) ABSTRACT

The invention relates to a method and system for managing and checking different identity data relating to a person. According to the invention, a derived-identity management server generates for the person at least part of the identity data with which said person can be authenticated in relation to a service provider for the derived-identity domain, on the basis of information derived from identity data from parent domains. The identity data generation processing ensures that no link can be established from two authentications in two separate domains in the absence of link information. If necessary, said link information is transmitted by a parent domain to a derived-identity server so that the latter establishes the link between the identity data of the derived-identity domain and the identity data of the parent domain, e.g. for the cascade revocation of a person from various domains.

19 Claims, 4 Drawing Sheets

METHOD FOR MANAGING AND CHECKING DATA FROM DIFFERENT IDENTITY DOMAINS ORGANIZED INTO A STRUCTURED SET

TECHNICAL FIELD

This invention relates in general to authentication of individuals, and more particularly situations in which an individual has to authenticate himself without necessarily divulging his main identity data.

The invention is particularly applicable in situations in which an individual has several "identities", each belonging to a different group.

"Identity" for the purposes of this disclosure and throughout the text refers to one or several identification data specific to the individual. Identification data for each identity depend on the group to which this identity belongs.

Thus, a particular individual may have several identities at different levels, in other words more or less strong identities in the sense that he must already have one identity at a given level before he can acquire another identity in a group belonging to a level that depends on the previous level. For example, national identity documents are essential to acquire a bank account or a social security card.

STATE OF THE ART

As has already been seen, registration of an individual in a group in order to obtain an identity within this group often depends on him holding another stronger identity. For example, the possession of an email address is often a prerequisite for a registration to an internet service.

However, this may be a problem, particularly when the supply of information about the strong identity enables a member or a manager of the new group to access the individual's private identity data that he does not wish to share.

For example, more and more individuals are exposed to the risk of private data (internet address or other personal data) being transmitted through Internet sites in an uncontrolled manner firstly to the manager and then in some cases by the manager to other players.

Therefore, there is a need to identify an individual to enable him to belong to a new group without it being possible to use the identity data used for this identification to work backwards to obtain main identity data that the individual does not wish to divulge.

Document EP 1 164 745 discloses a method of managing a group, disclosing creation and assignment of a group signature to an individual and identification of the individual by means of this signature.

However in this document, if an individual wishes to belong to a group, he necessarily has to divulge his main identity data, for example his name. Nor does this document describe how an individual can be identified without using his main identity data.

Document FR 2 925 732 also discloses a method of biometric authentication that enables an individual to authenticate himself anonymously, using combined biometric and cryptographic data.

This method may be combined with the use of group signatures, for example such as group signature schemes described in:

D. Boneh and Shacham; "Group signatures with verifier-local revocation", IN V. Atluri, B Pzistmann, and P. D. McDaniel, editors, *ACM Conference on Computer and Communications Security*, pages 168-177, ACM 2004, and/or in L. Chen and J. Li. "VLR group signatures with indisputable exculpability and efficient revocation"; in A. K. Elmagarmid and D. Agrawal, editors, SocialCom/PASSAT, pages 727-734, IEEE Computer Society, 2010, J. Bringer and A. Patey, "Backward unlinkability for a VLR group signature scheme with efficient revocation check. Cryptology ePrint Archive—Report 2011/376.

These group signature schemes enable an individual to authenticate himself by proving that he belongs to a given group while remaining anonymous.

Therefore, this method can be used to create an identity from biometric information specific to an individual, and to authenticate the individual while preserving his anonymity.

PRESENTATION OF THE INVENTION

The invention discloses a method of using an existing identity to generate a so-called "derived" identity, the derived identity being related to the parent identity, the link between these two identities nevertheless being masked such that it is impossible to follow this link starting from authentications of either of these identities, however this link can be used for example to revoke the "derived" identity of an individual when the parent identity of this individual is itself revoked.

In particular, it discloses a method of management and controlling of different identity data of an individual, these data corresponding to several identity domains organised into a structured set, in which at least one control system can be used for a given identity domain to implement an authentication of the individual from the identity data associated with this domain for the individual.

Identity data can be generated for a derived identity domain for which identity data are necessary for one or more parent domains by implementing an authentication processing of the individual for each parent identity domain starting from identity data of the individual for the parent domain, on a management server of the derived identity domain, during which:

information dependent on the parent domain identity data and at least one item of information to prove validity of these data are transmitted to the derived identity domain management server, the derived identity management server authenticates the individual for the parent domain and uses the proof information to control that the information transmitted is valid.

Depending on the authentication and control results:

the derived identity management server generates at least some of the identity data with which the individual can authenticate himself with a service provider for the derived identity domain, as a function of the information transmitted, for the individual, said derived identity management server stores derived information containing all or some of the information exchanged during the authentication processing so that the link between identity data of the derived identity domain and identity data of the parent domain can be made later if required, depending on link information transmitted by a parent domain, the generation processing done by the different identity servers being such that no link can be created from two authentications in two distinct domains if this link information is not available.

Therefore, an individual can use such a method to derive an identity, in other words to generate an identity from a second stronger identity without eliminating the anonymity of the individual.

It also makes fraud impossible during authentication of an individual, despite the link between two identities of two distinct levels of a single individual.

In one embodiment, in order to authenticate an individual with a service provider for an identity domain, information determined as a function of the domain identity data is transmitted to this service provider, the processing implemented for this determination making the information thus transmitted anonymous for any entity except for the domain management server and the individual who is authenticating himself.

Furthermore, identity data of an individual may comprise biometric data of the individual and/or data obtained by processing of biometric data.

Also, embodiments of the disclosed method also enable revocations. In this way, when an individual is revoked for one identity, he can no longer authenticate himself with this identity. In particular, the method can be used for cascade revocations, in other words it is possible to revoke an individual at a given identity level (domain) if he has been revoked at a higher identity level (domain), (for example his car assurance may be withdrawn if he has lost his driving license).

Thus, individual revocation processing is provided for each identity domain management server, through which it publishes revocation information used by service providers to prevent an individual revoked from one domain from authenticating himself using the identity data associated with this domain.

It thus becomes impossible to generate derived identity data using identity data associated with this domain for the individual.

For example, during revocation processing by a parent domain server, this server transmits link information associated with a revoked individual to each derived identity management server, this information being processed by said server to implement the revocation processing for the individual, if the individual has identity data for this derived identity domain.

Optionally in some cases, it is also possible to revoke an individual from one domain if he has been revoked from a derived identity domain.

In particular, during revocation processing by a derived domain server, this server transmits derivation information associated with a revoked individual to a chosen parent identity management server, this information possibly being processed by said server, so as to implement the revocation processing of the individual for this parent domain.

The invention also discloses a management and controlling system implementing the disclosed method.

DESCRIPTION OF THE FIGURES

Other characteristics, purposes and advantages of this invention will become clear after reading the following detailed description with reference to the appended figures given as non-limitative examples in which.

DETAILED DESCRIPTION OF AT LEAST ONE EXAMPLE EMBODIMENT

Context and Formal Definition

Figure 1:
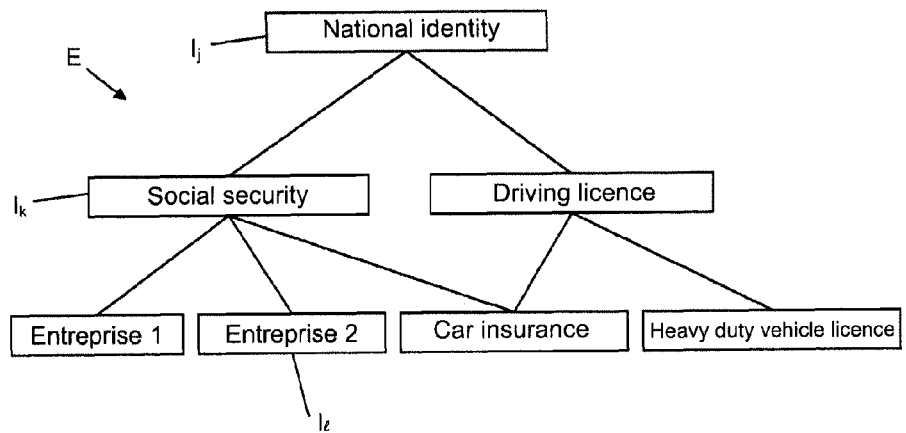
FIG. 1 shows a set of partially ordered identities for which a derivation method according to the invention can be used, FIG. 2 diagrammatically shows an example embodiment of management of an identity.

An ordered set E of identity domains is shown with reference to FIG. 1.

In this example, the national identity $I_J$ is at the highest level domain. This identity is necessary to register with the social security (identity domain $I_K$) and to obtain a driving license. When the registration with social security has been validated or the driving license has been obtained, secret identity data are sent to the individual, for example by being stored on a smart card type memory.

Identity data sent during the registration with social security may be necessary to an employer to hire employees and to assign accreditations to them for the company domain $I_l$.

This set is organised so as to be partially ordered, and the following relations are applicable:

reflexivity: $\forall x \in E, x \leq x$, transitivity: $\forall x, y, z \in E, (x \leq y \wedge y \leq z) \Rightarrow (x \leq z)$ antisymmetry: $\forall x, y \in E, (x \leq y \wedge y \leq x) \Rightarrow (x = y)$ where $x \leq y$ means that identity domain x is below identity domain y.

In the following, it will be said that an identity domain x of the partially ordered set E is a parent of another domain y if $y \leq x$ and $\forall z \in E, (z \leq x \wedge y \leq z) \Rightarrow (x = z \vee y = z)$ For example, returning to FIG. 1, the "driving license" identity domain is a parent of the "car insurance" domain; the national identity is parent of the "social security" identity.

In the figure, the links shown between two different domains indicate the identity(ies) that the individual $M_i$ must possess in order to be able to acquire an identity in the immediately lower domain. In the example, individual $M_i$ must have a social security identity and a driving license before he can obtain an identity in the "car insurance" domain $I_l$.

The implementation described in the following uses the example of a group signature as disclosed in the article by Bringer and Patey already mentioned. This article could advantageously be referred to, since the example embodiment described in detail below uses the same notations.

In the protocol disclosed in this article, for each group:

the manager GM has a secret key msk, each individual $M_i$ who is a member of the group has a secret key $sk_i = (f_i, x_i, A_i)$ where element $f_i$ is chosen by $M_i$ and elements $x_i$ and $A_i$ are supplied by the manager, for each individual, there is a revocation token $rt_i$ derived from $sk_i$ stored by the manager in a database DB; in the following example, we have $rt_i = x_i$;

the manager publishes a revocation list RL listing the revocation tokens of users revoked from the group.

In particular, this protocol uses two algorithms:

"Sign" that one member of the group uses to sign a message using his secret key $sk_i$, "Verify" that any person provided with only the revocation list can use to verify the validity of a signature, which certifies that the signatory belongs to the group.

Example Embodiment

Figure 2:
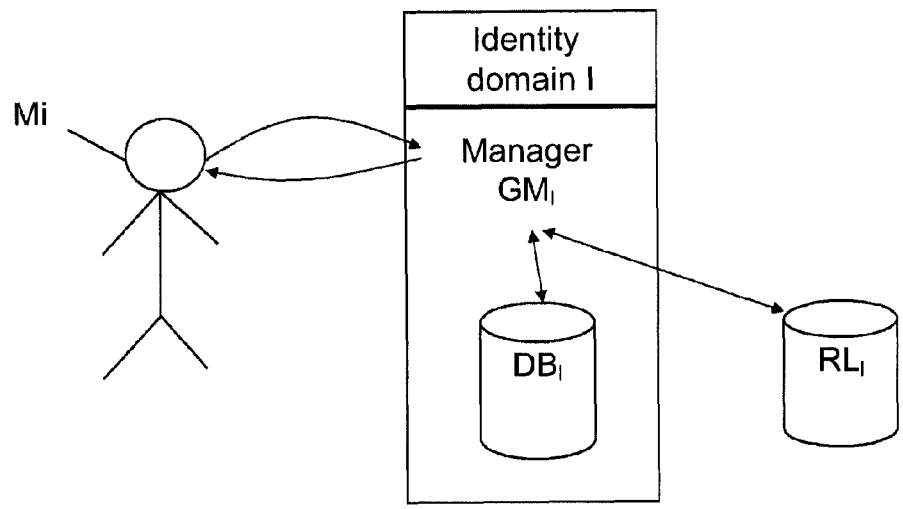

In fact, in the following example and with reference to FIG. 2, each identity domain I is managed by a corresponding identity manager $GM_I$ that has the authority to issue an identity to the individual $M_I$ and is a group manager as defined in the previous article.

This manager $GM_I$ may be in the form of a computer program installed in an identity management server associated with storage capabilities and particularly a database $DB_I$ that stores enrolment data of individuals with an identity in this domain, and revocation tokens specific to each individual. This program manages enrolments and revocations as described below. It does not participate in authentications that are managed by programs specific to service providers requiring the possession of an identity in this domain.

Enrolment

Figure 3A:
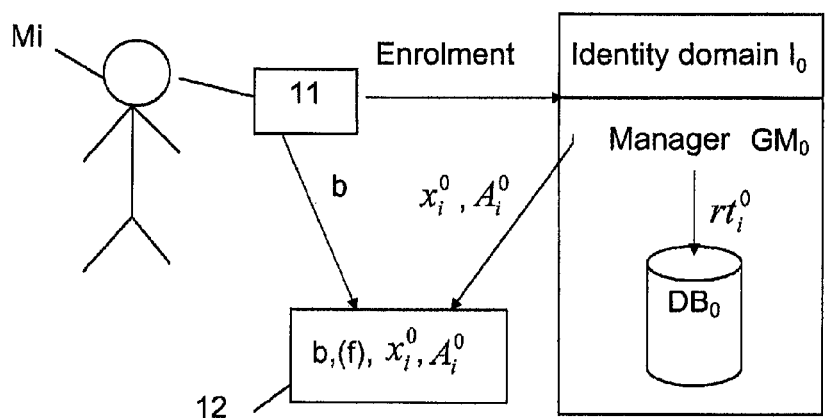
FIGS. 3a and 3b show examples of a method of acquisition of an identity and an authentication example, respectively, FIG. 4 diagrammatically shows an example identity derivation conforming with one possible embodiment of the invention, FIG. 5 diagrammatically shows the different steps in the derivation shown in FIG. 4.

In order to acquire the first identity $I_0$, namely in this case the national identity $I_j$, the individual $M_i$ can implement an enrolment method similar to that described in document FR 2 925 732 and as shown in FIG. 3a. In particular, for example he can acquire a biometric trait b using a sensor 11, that is then stored in a personal card 12 such as a smart card or a USB key. It can also be printed on paper.

Such a biometric trait b may be any type of currently used biometric trait, such as biometric data related to the iris, the face, a fingerprint, etc.

In the case of such an enrolment procedure, the biometric trait is also protected by means of a cryptographic function by individual $M_i$, for example the cryptographic function being a Hash function.

The biometric trait is also stored on card 12 in this protected form $f_i^o = Hash(b)$ which forms the first element of a group signature key $sk_i^o$.

In this case, the personal card 12 of the individual $M_i$ can also memorise the two other elements of a group signature key:

- $x_i^o$, chosen at random by the manager in the case of the first identity and generated as described below in the case of derived identities;
- $A_i^o$, generated by the manager $GM_0$ from a group secret parameter msk of the element $x_i^o$ and the protected biometric data $f_i^o$. Generation of this element is described in more detail in articles dealing with the group signatures mentioned above.

The total secret key necessary to authenticate the individual $M_i$ is then a group signature key $sk_i^o = (x_i^o, f_i^o, A_i^o)$. In this example, the signature key is obtained by means of biometric elements. Other embodiments are possible, for example by choosing $f_i^o$ at random.

Therefore, the personal card 12 of individual $M_i$ can contain data b, $x_i^o$ and $A_i^o$, and possibly the protected part $f_i^o$ of the biometric data.

Authentication

Figure 3B:
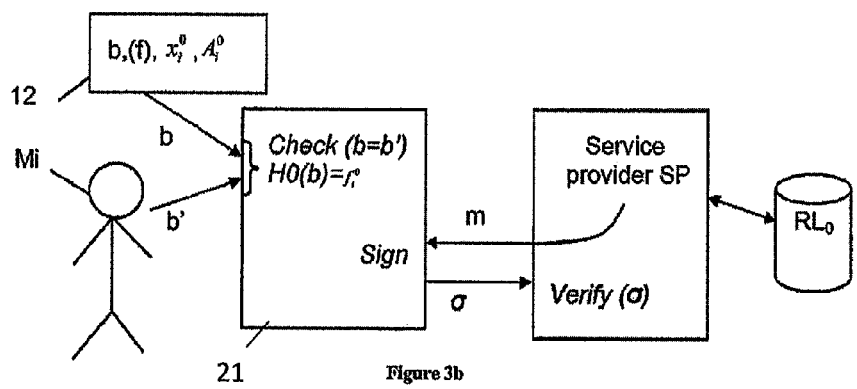

The authentication method is illustrated diagrammatically in FIG. 3b. Before the individual $M_i$ can be authenticated with a service provider SP, a control device 21 acquires a biometric trait b' of the individual, reads the biometric trait b stored on the card and compares the two biometric traits.

To achieve this, the control device 21 may for example be a device provided with a biometric data sensor and a reader of the personal storage device 12 (for example a smart card reader) that are not shown in the figure.

Alternately, the device 21 comprises only a reader of the personal storage device 12, and the acquisition and comparison are made in the personal storage device 12.

If the two traits b and b' match, the control device 21 (or the storage device 12) applies the Hash function that it holds to the biometric trait b, to obtain the data $f_i^o$).

Alternately, if the data $f_i^o$ is stored in the personal card 12, the reader can acquire this data.

Finally, if this authentication process allows for the use of group signatures, the service provider SP can send a message m to the control device 21 that replies by sending a signature on this message. This signature may be generated by the control device that consists of the reader 21 or by the card 12, using the Sign algorithm, with the secret key stored in the card of the individual $M_i$. Finally, a verification algorithm Verify using the message signature and the associated domain revocation list as input, is implemented by the service provider to verify that the signature is valid. If this verification is valid, it is guaranteed that the associated individual has not been revoked from the identity domain concerned.

This authentication principle is also disclosed in FR 2 925 732. It is based on group signature algorithms (including Sign and Verify) described in the articles mentioned in the introduction to this text.

The signature sent to the service provider's server is such that the information thus sent is anonymous for any entity except for the individual who is authenticating himself and the management server of the domain (group) to which the individual belongs.

Derivations from Reference Identities

Figure 4:
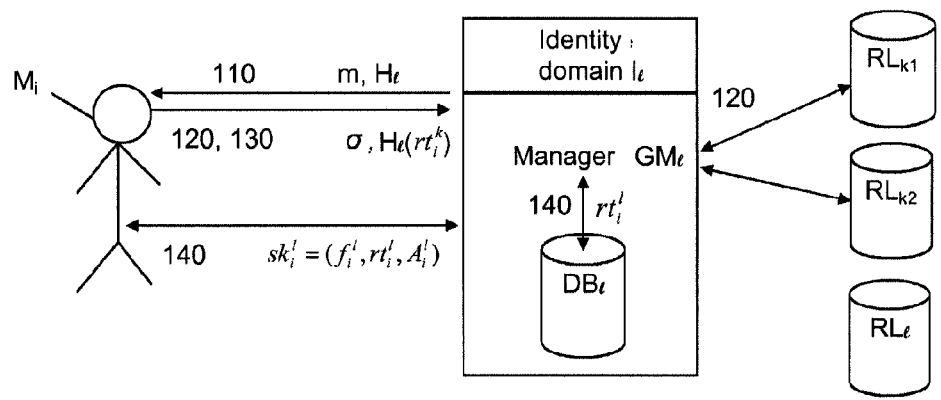
Figure 5:
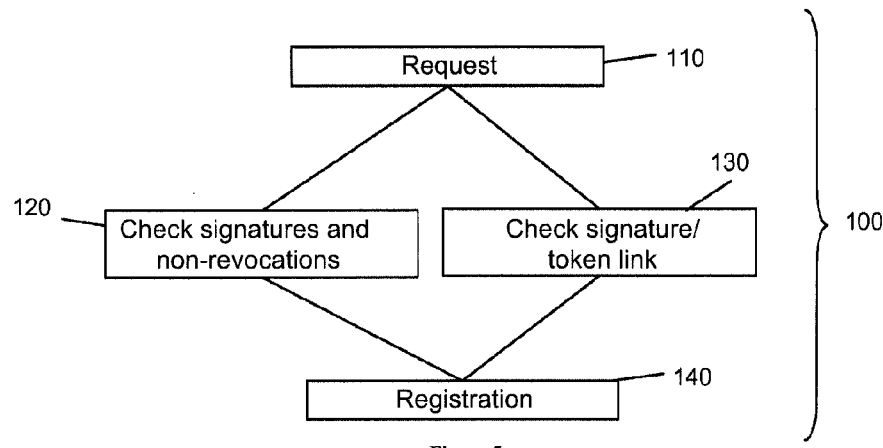
Figure 6:
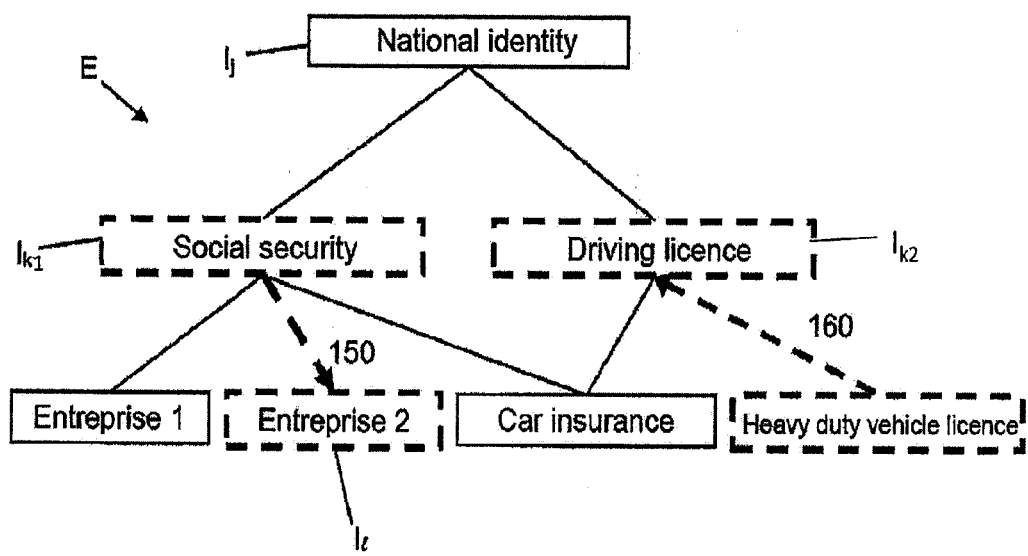
FIG. 6 shows an example embodiment of a cascade revocation.

The following describes the method of deriving identities with reference to FIGS. 4 and 5.

The following considers the example of an individual $M_i$ holding a national identity $I_0$ and all identities $I_k$ necessary to obtain an identity $I_j$ and who would also like to obtain the identity $I_l$, for example "car insurance". The example in FIG. 4 shows two identities $I_{k1}$ and $I_{k2}$, each managed by a server or a group manager $GM_{k1}$ and $GM_{k2}$ respectively.

When an individual $M_i$ would like to acquire an identity $I_l$ he initiates an enrolment method 100.

During a step 110, the group manager $GM_e$ sends a request message m to individual $M_i$, and a derivation function $H_l$ specific to the identity $I_l$. This function may be public.

In response to this request, the individual signs the request message m using his secret signature key $sk_i^k$, which is possibly a group signature key for all identity domains k necessary to obtain identity data in domain $I_l$.

This step repeats the authentication phase described above, with the management server of the domain manager $I_l$ as the service provider requesting the identities of domain $I_k$.

During this step, in addition to a group signature for each identity $I_k$, the individual sends his so-called derivation tokens $H_e(rt_i^k)$ calculated from each of the revocation tokens $rt_i^k$ associated with $I_k$ (that the individual finds from his secret key) and the derivation function $H_e$ associated with $I_l$.

The calculations and exchanges are made by the control device 21 and/or the card 12, in the same way as for authentication.

The use of the derivation function $H_l$ guarantees confidentiality of the revocation tokens $rt_i^k$.

Preferably, this function $H_l$ is a so-called single directional function. This means that it is impossible to find the antecedent of a signal coded by the function, and therefore to guarantee that the revocation token $rt_i^k$ is known only to the individual $M_i$ and the identity manager $GM_k$. For example, this function may be defined by $H_l(x) = h_l^x$ where $h_l$ is a group generator in the algebraic sense of the term, in which the Discrete Logarithm Problem is difficult.

Proof of the Validity of the Derivation Token

The signature is also built so as to make sure that the derivation tokens are legitimate, particularly by making sure that it is possible to find the link between so-called derivation tokens $H_l(rt_i^k)$ and revocation tokens $rt_i^k$, so that the cascade revocation method described below can be used correctly.

For example, this can be done using the Bringer and Patey scheme that enables a VLR (Verifier-Local Revocation) group signature possessing the so-called Backward Unlinkability Property.

This property, in its normal usage context, implies that authentications are related to time dependent periods. Thus, an individual may be revoked in some periods but not others, always using the same signature keys.

In this particular case, the revocation tokens of each period correspond to the above mentioned derivation tokens, in other words there is a single directional function $H_l$ for each period l and the revocation token of an individual $M_i$ for the period l is equal to $H_l(rt_i)$ where $rt_i$ is its global revocation token. Knowledge of a periodic revocation token is not sufficient to know a global revocation token. It is also impossible to know if two periodic tokens for two different periods originate from the same global revocation token, without knowing this global revocation token.

Use of a group signature with backward-unlinkability makes it easy to verify that the derivation token is actually associated with the signatory.

Thus, during processing to generate a new identity, the individual will sign with his $sk_i^l$ key for a dummy period l associated with the function $H_l$. The derivation token $H_l(rt_i)$ is then the periodic revocation token for the dummy period l.

Authentications used in other cases and particularly authentications obtained from service providers other than the identity manager, do not use this property.

Verification of the Validity of the Derivation Token

Therefore, the domain manager $I_l$ verifies the validity of the derivation token $H_l(rt_i^k)$ using the revocation test associated with the dummy period l with the signature σ and the derivation token $H_l$. In the example of the Bringer and Patey signature, and using the notations in the associated article, it retrieves the elements B and L from α and checks if $$L = B^{Hi(rt_i^k)}.$$

If this is the case for each of the parent domains $I_k$, the manager can go on to the next registration step.

Other Steps

The group signatures thus generated enable the identity manager $GM_l$ to start the step 120 to verify that the individual $M_i$ actually has all identities $I_k$, and the derivation token $H_l(rt_i^k)$ sent is actually linked to the received signature.

To do this, the identity manager $GM_l$ uses the above mentioned Verify algorithm plus a phase to verify the link between the signature and the derivation token received for each of the identities $I_k$. For example, this can be done using the Verify algorithm in the Bringer and Patey scheme.

The identity manager $GM_l$ also verifies that the individual $M_l$ has not been revoked from any identity $I_k$ during a step 130, using part of the Verify algorithm and the public revocation lists $RL_k$. Alternately, this verification may be entirely included in step 120.

If the two conditions in steps 120 and 130 are satisfied, the identity manager $GM_l$ can create an item of data in the derived identity domain $I_l$ for individual Mi during a registration step 140.

This step corresponds to the method described above with reference to FIG. 3a, except that the identity manager does not choose the element $x_i^l$ for level l at random, but derives it from derivation tokens $H_l(rt_i^k)$ associated with the domains $I_k$ and $I_l$ received during step 110.

For example, element $x_i^l$=Hash $(msk_l||(x_i^k)k\in K)$ can thus be obtained, where msk is the secret key of the identity manager $GM_l$ and $x_i^k=H_l(rt_i^k)$.

This element $x_i^l$ is actually the second part of the secret key of the individual $M_i$ for level l:$sk_i^l=(f, x_i^l, A_i^l)$, and as such it is stored in an identification card 12 generated for the individual $M_i$. It is also stored in the database $DB_l$ of the identity l in addition to the set of derivation tokens $H_l(rt_i^k)$ The first part of the secret key $sk_i^l$ is derived from an acquisition of a biometric trait B of the individual $M_i$. It may be a new protected acquisition b' or it may be the protected form f of an acquisition b already present on the individual's identification card for a parent identity.

The third part of the secret key $A_i^l$ is generated by the derived identity manager server $GM_l$ starting from the remainder of the key and the group secret key msk. The revocation token $rt_i^l$ of the individual Mi for the identity Il is derived from this secret key; for example it may be element $x_i^l$.

Thus, if individual Mi would like to authenticate himself for domain $I_l$ with a service provider SP at a later time, all he needs to do is to use the authentication method described above with reference to FIG. 3b, using his secret key $sk_i^l$.

Consequently, the derived identity domain management server $GM_l$ generates at least some of the identity data with which the individual can authenticate himself with a service provider for the derived identity domain, as a function of the information sent during the authentication, for the individual.

The server $GM_l$ also stores all or some of the information exchanged during the authentication processing (derivation information) in a private database, so that it will be possible to make the link between identity data of the derived identity domain and identity data of the parent domain, depending on link information transmitted by a parent domain (in fact revocation tokens), at a later time if required.

Nevertheless, generation processing by the different identity servers described above is such that no link can be created from two authentications in two different domains if this link information is not available.

Revocation Method

If the identity manager $GM_l$ (parent manager) would like to revoke the individual, all that it needs to do is to publish the revocation token $rt_i^l$ (revocation information) in the public revocation list $RL_l$.

Downwards Revocation

Thus, servers of identity managers $GM_m$ of identities $I_m$ immediately below level l (managers of derived identities in domain $I_l$) initiate a downwards revocation method 150, which is enabled by link information between the different domains (revocation tokens).

The revocation token $rt_i^l$ is published in $RL_l$. Thus each manager $GM_m$ of an identity $I_m$ applies the derivation function $H_m$ to this freshly published token $rt_i^l$. If the result obtained is stored in the database $DB_m$, this means that the individual also has an identity for the domain $I_m$; the manager $GM_m$ then finds the identity associated with this individual for level m and publishes the associated revocation token $rt_i^m$ in $RL_m$. This method is repeated recursively at lower levels.

On the other hand, signatures for the different identities have no links with each other due to the properties of the derivation functions $H_l$. In particular, it is impossible for two signatures made for two different levels to know whether or not they were made by the same individual.

In particular, in case of revocation, a signature remains completely anonymous for managers of identities not affected by the revocation.

It will also be noted that derived identity data cannot be generated through the publication of revocation data contained in revocation tokens.

Upwards Revocation

Optionally, an upwards revocation method 160 is also possible if an identity manager at level l believes that an identity manager at a parent level should also revoke individual $M_i$.

In this case, the identity manager $GM_l$ sends the derivation token $H_l(rt_i^k)$ obtained during phase 100, to the identity manager $GM_k$. The identity manager $GM_k$ can then apply the function $H_l$ to the set of revocation tokens $rt_i^k$ of individuals $M_i$ registered in its private database $DB_k$ in which data are stored, to determine which of these revocation tokens agrees with the derivation token $H_l(rt_i^k)$.

The manager $GM_k$ can then revoke the identity of the individual if it wishes.

This identity management method has interesting downwards and upwards revocation properties, while maintaining anonymity of individuals.

It is also compatible with the use of VLR group signatures with Backward Unlinkability, as in the above mentioned articles. In the latter case, the derivation method according to the invention can also verify all required security properties (correctness, traceability, exculpability, selfless anonymity) that are also described in these publications.

Finally, although the example disclosed herein uses the construction of a group signature described by Bringer and Patey in the article mentioned in the introduction, it is nevertheless applicable to any VLR (Verifier-Local Revocation) group signature with so-called Backward Unlinkability property.

The invention claimed is:

1. A method of management and control of different identity data of an individual, the different identity data corresponding to several identity domains organised into a structured set, wherein the identity data for at least one parent domain is necessary to generate identity data for a derived identity domain, the method comprising,
   authenticating the individual for each parent domain starting from the identity data of the individual for the parent domain comprising a secret key and a revocation token for the parent domain identity data, said authentication being performed by a derived identity domain management server and comprising:
   receiving information dependent on the parent domain identity data, comprising an information obtained from the revocation token of the individual for the parent domain identity data, and at least one item of information as a proof of validity of said information dependent on the parent domain identity data,
   using the validity proof, verifying that the information dependent on the parent domain identity is valid, and
   authenticating the individual for the parent domain using said information dependent on the parent domain identity data,
   the derived identity domain management server generating, from the received information dependent on the parent domain, at least one identity data with which the individual can authenticate himself with a service provider for a derived identity domain, said identity data generation comprising generating, from the revocation token of the individual for the parent domain identity data, a derived identity secret key and a revocation token of the individual for the derived identity domain, and
   the derived identity domain management server storing derivation information containing at least one of the information exchanged during the authentication processing so that a link between identity data of the derived identity domain and identity data of the parent domain can be made later if required, according to link information transmitted by a parent domain, the generation processing of the identity data for the derived identity domain done by the different identity domain management servers being such that no parent domain identity data can be inferred from the derived domain identity data.

2. The method of management and control according to claim 1 in which authentication of the individual with a service provider for an identity domain comprises:
   processing the parent domain identity data in order to obtain an information which is anonymous for the service provider, and
   transmitting said information to the service provider.

3. The method of management and control according to claim 1, in which identity data of an individual comprise biometric data of the individual and/or data obtained by processing of the biometric data.

4. The method of management and control according to claim 1, in which an individual revocation processing is used by an identity domain management server through which the identity domain management server publishes an item of revocation information used by service providers to prevent the individual revoked from one domain from authenticating himself using the identity data associated with that one domain.

5. The method according to claim 1, in which during a revocation processing by a parent domain server, the parent domain server transmits the link information associated with a revoked individual to each derived identity management server, the link information being processed by said derived identity management server to implement the revocation processing for the individual, if the individual has identity data associated with the derived identity domain.

6. The method of management and control according to claim 5, in which during revocation processing by a derived identity domain server, the derived identity domain server transmits derivation information associated with a revoked individual to a chosen parent identity domain management server, the derivation information possibly being processed by said parent identity domain management server so as to implement the revocation processing of the individual for the parent identity domain.

7. The method according to claim 2, in which an algorithm of a group signature type is used in the authentication processing with the service provider, the parent domain identity data comprising a group signature key specific to the identity domain.

8. The method according to claim 4, in which each identity domain is associated with a public database containing a public revocation list, the revocation processing used by a domain management server to revoke an individual comprising adding to said list a revocation token determined by said identity domain management server from the identity data for the individual, this revocation token being used by service providers to prevent the revoked individual from authenticating himself using the identity data associated with the identity domain.

9. The method according to claim 5 or claim 8, in which revocation tokens are link information sent to each derived identity management server.

10. The method according to claim 1, in which the derivation information is calculated from link information associated with the individual, using a so-called single directional function associated with the derived identity domain.

11. The method according to claim 1, in which the derived identity management server:
    calculates the identity data from the derivation information for each parent identity domain, during the generation processing of new identity data, and
    stores both the derivation information and the new identity data in a private database, so as to search for the new identity data using the derivation information.

12. The method according to claim 5, claim 10 or claim 11, in which during the revocation processing of the individual, a parent identity domain management server sends the link information, and the derivation identity domain management server calculates the derivation information from the link information thus transmitted, so as to be able to search for the associated identity data if the individual has an identity for the derived identity domain, and thus revoke the individual.

13. The method according to claim 7, in which the group signature used is a Verifier-Local Revocation (VLR) with Backward unlinkability.

14. The method according to claim 7, in which each identity domain is uniquely associated with a time period of the group signature processing, such that
    single directional functions associated with the various identity domains are single directional functions associated with the time periods of the associated group signature, and
    the authentication used during processing for generating a new identity uses the associated group signature, together with the time period associated with the derived identity domain, the group signature being used also as information to prove validity of these data, and the Backward Unlinkability property is not used in the authentications obtained from service providers other than the identity management server.

15. The method of managing identities according to claim 1, in which identity data generated by the derived management identity server are stored on a personal portable medium that is given to the individual.

16. The method according to claim 15, in which the controlling system also comprises a reader for reading the identity data stored on the portable medium, the reader and/or the portable medium performing authentications and/or comparison between biometric data.

17. Method according to claim 15, in which the reader and/or the card includes a sensor for reading biometric traits of the individual.

18. The method according to claim 3, in which the individual's identity data for the derived identity domain comprise an item of data corresponding to a biometric trait of the individual acquired during authentication processing used for generating the identity data for the individual in said derived identity domain, and/or retrieved from an acquisition done during the authentication processing used for generating identity data for the individual in a parent identity domain.

19. A system for management and control of various identity data of an individual, the various identity data corresponding to several identity domains organised in a structured set,
    said system comprising at least one derived identity domain management server and at least one parent derived identity domain management server,
    an individual holding, for each identity domain, a personal identification device comprising a memory in which for each identity domain, the identity data associated with the identity domain for the individual are stored
    said memory being readable by a control device,
    the derived identity domain management server receiving information dependent on the parent domain identity data and at least one item of information as proof information to prove validity of the parent domain identity data, and of:
    authenticating the individual for a parent domain starting from the identity data of the individual for the parent domain comprising a secret key and a revocation token for the parent domain identity data, said authentication being performed by the derived identity domain management server;
    controlling that the information received is valid using the proof information;
    depending on the authentication and control results, generating at least one of the identity data with which the individual can authenticate himself with a service provider for a derived identity domain, as a function of the information received, for the individual, wherein said generating, generates from the revocation token of the individual for the parent domain identity data, a derived identity secret key and a revocation token of the individual for the derived identity domain, and
    said parent derived identity domain management server comprising a database for storing derived information containing at least one of the information exchanged during the authentication processing so that the link between identity data of the derived identity domain and identity data of the parent domain can be made later if required, depending on link information transmitted by a parent domain, the generation processing of the identity data is done by different identity domain management servers being such that no link can be created from two authentications in two distinct domains if this link information is not available.

\* \* \* \* \*